United States Patent [19]

Brodsky

[11]  4,101,500
[45]  Jul. 18, 1978

[54] BRAKE LINING COMPOSITIONS HAVING FRICTION PARTICLES OF AN AROMATIC AMINE MODIFIED NOVOLAC RESIN AND AN AROMATIC CARBOXYLIC COMPOUND

[75] Inventor: Philip H. Brodsky, Springfield, Mass.

[73] Assignee: Monsanto Company, St. Louis, Mo.

[21] Appl. No.: 735,710

[22] Filed: Oct. 26, 1976

[51] Int. Cl.² ................ C08L 61/10; C08L 61/14
[52] U.S. Cl. ................................ 260/38; 260/838;
528/163; 260/998.13; 260/DIG. 39
[58] Field of Search .............. 260/51.5, 838, 38; 51/298

[56] References Cited

U.S. PATENT DOCUMENTS

| | | | |
|---|---|---|---|
| 2,885,379 | 5/1959 | Taylor et al. | 260/838 X |
| 3,455,868 | 7/1969 | D'Alessandro | 260/838 X |
| 3,558,559 | 1/1971 | LeBlanc | 260/51.5 X |
| 3,647,722 | 3/1972 | Albertson et al. | 260/838 X |
| 3,673,276 | 6/1972 | Keller et al. | 260/838 X |
| 3,756,980 | 9/1973 | Huck et al. | 260/51.5 X |
| 3,816,558 | 6/1974 | Huck | 260/838 |
| 3,878,160 | 4/1975 | Grazen et al. | 260/51.5 X |
| 3,966,670 | 6/1976 | Grazen et al. | 260/51.5 X |
| 4,014,850 | 3/1977 | Thorpe | 260/38 |
| 4,026,867 | 5/1977 | Gardiner | 260/38 X |

*Primary Examiner*—Howard E. Schain
*Attorney, Agent, or Firm*—Joseph S. Nelson; William J. Farrington; James C. Logomasini

[57] ABSTRACT

The present invention relates to a brake lining composition comprising friction particles and a resin binder therefor, said friction particles being a thermoset reaction product of an amine modified novolac resin and an aromatic polycarboxylic compound having improved thermal stability. The invention also relates to a method for preparing said brake lining composition.

14 Claims, No Drawings

BRAKE LINING COMPOSITIONS HAVING FRICTION PARTICLES OF AN AROMATIC AMINE MODIFIED NOVOLAC RESIN AND AN AROMATIC CARBOXYLIC COMPOUND

BACKGROUND OF THE INVENTION

This invention relates to novel cured phenolic resins to be used as a friction particle material. It is especially useful where cashew nut shell oil friction particles, called "Cardolite" have been used in the past.

Novolac phenol aldehyde resins are phenol-ended chain polymers. They are formed by the reaction of an aldehyde with an excess of phenol in the presence of an acid catalyst and/or heat. They are thermoplastic, permanently soluble and fusible. However, upon the addition of a curing agent, they can be cured into an insoluble, infusible resin. Thus, novolac resins are known as "two-stage" resins.

Phenol aldehyde condensation products have been used as binders for abrasive materials. However, to our knowledge, the novel cured phenol aldehyde products of this invention have not been used as a friction particle per se.

As used herein "friction particle" is intended to mean having the properties of substantially no softening at elevated temperatures and will not flow together or cohere with other particles, as a "friction binder" would, or fuse with like friction particles. It is insoluble, having an acetone extraction of less than 10% and often less than 5%; it is infusible, i.e., has gone beyond the B stage, to the C stage. It will not melt at 700° F. A friction particle is held in place with a friction binder.

As used herein, a "friction binder" has the properties of flowability, and has adhesive and cohesive bonding action and thereby binds together the asbestos and other additives (including a friction particle) necessary for building a brake lining or other similar article of manufacture. The binder, as supplied to the industry, will melt as a dry powder or is a liquid resin, and can be either an A stage or B stage resin. The binder becomes a C stage resin after it is combined with the other ingredients and cured.

This composition of the binder, friction particle and other additives, is heated to about 300°-400° Fahrenheit and pressed at about 500-2000 pounds per square inch in order to form a brake lining composition, or clutch facing or other braking device. Thus, the friction particle is substantially insoluble and infusible, softening only at elevated temperatures (i.e., above about 400°-500° Fahrenheit). Conventional "two stage" phenolic novolac resin can be used as a binder in the composition of the present invention.

It has now been found that a composition of matter, useful as a friction particle, can be prepared as a reaction product of an aromatic amine modified novolac resin cured in combination with a particular aromatic polycarboxylic compound. The friction particles have superior high temperature properties in brake lining compositions. Friction particles prepared from polymerized cashew nut shell liquids, known as Cardolites, are commonly used as friction particles but fade (loss of coefficient of friction) at temperatures as low as 700°-800° F. Substitution of the friction particles of the present invention extend the onset of fade from about 750° F. to about 1000° F. giving high utility in brake lining compositions and providing a recognized technical advance in the art in compositions having, e.g., about 15 to 30% by weight of phenolic novolac resin binder, about 30 to 60% by weight of asbestos, up to about 40% by weight of fillers and about 5 to 15% by weight of friction particles.

SUMMARY OF THE INVENTION

The present invention relates to a novel brake lining composition comprising friction particles and a resin binder therefor, said friction particles comprising a thermoset reaction product of (A) an aromatic amine modified novolac resin characterized by having
  (1) a number average molecular weight of from about 200 to 1000,
  (2) at least two aryl moieties per molecule, the aryl nucleus of each aryl moiety containing from 6 through 10 carbons atoms each,
  (3) at least one divalent bridging moiety of the formula:

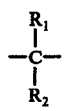

wherein R and R are each individually selected from the group consisting of hydrogen, lower alkyl, lower alkalene, lower haloalkyl aryl of from 6 through 12 carbon atoms and haloaryl of 6 through 12 carbon atoms, said bridging moiety having the unsatisfied valences of its carbon atom each bonded to a different one of said aryl moieties,
  (4) at least one >NH group per molecule, one bond of which is directly attached to one of said aryl nuclei and the other bond of which is attached to another of said aryl nuclei or to a radical $R_1$ as defined above,
  (5) at least one OH group per molecule each such group being directly attached to a different one of said two aryl nuclei,
  (6) a percent oxygen acetyl of from about 3 to 26, and
  (7) a percent nitrogen acetyl of from about 3 to 26, and (B) an aromatic polycarboxylic compound of the formula:

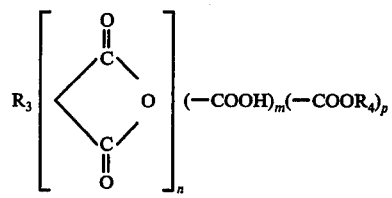

in which $R_3$ is an aromatic radical of three, four, five or six valences and containing from 6 to 24 carbon atoms, $R_4$ is a monovalent hydrocarbon radical containing less than 19 carbon atoms; $n$ is an integer of from 0 through 3; $m$ is an integer of from 0 through 6; $p$ is an integer of from 0 through 6; when $n$ is 0, the sum of $m+p$ is an integer of from 3 through 6; when $n$ is 1, the sum of $m+p$ is an integer of from 1 through 4; when $n$ is 2, the sum of $m+p$ is an integer of from 0 through 2; and the sum of $n$ and $p$ is always at least 1, (C) the relative proportions of said amine modified resin and said aromatic polycarboxylic compound being such that said composition is thermoset by heat.

The invention also relates to a novel method of forming a brake lining composition comprising the blending of a resin binder, friction particles and additives wherein the improvement comprises, the blending of friction particles comprising a thermoset reaction product of:

(A) an aromatic amine modified novolac resin characterized by having:
(1) a number average molecular weight of from about 200 to 1000,
(2) at least two aryl moieties per molecule, the aryl nucleus of each aryl moiety containing from 6 through 10 carbon atoms each,
(3) at least one divalent bridging moiety of the formula:

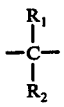

wherein $R_1$ and $R_2$ are each individually selected from the group consisting of hydrogen, lower alkyl, lower alkalene, lower haloalkyl aryl of from 6 through 12 carbon atoms and haloaryl of 6 through 12 carbon atoms, said bridging moiety having the unsatisfied valences of its carbon atom each bonded to a different one of said aryl moieties,
(4) at least one >NH group per molecule, one bond of which is directly attached to one of said aryl nuclei and the other bond of which is attached to another of said aryl nuclei or to a radical $R_1$ as defined above,
(5) at least one OH group per molecule each such group being directly attached to a different one of said two aryl nuclei,
(6) a percent oxygen acetyl of from about 3 to 26, and
(7) a percent nitrogen acetyl of from about 3 to 26, and (B) an aromatic polycarboxylic compound of the formula:

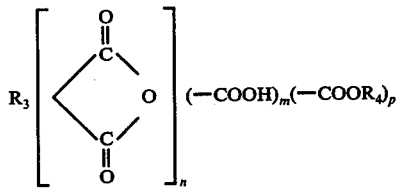

in which $R_3$ is an aromatic radical of three, four, five or six valences and containing from 6 to 24 carbon atoms, $R_4$ is a monovalent hydrocarbon radical containing less than 19 carbon atoms; $n$ is an integer of from 0 through 3; $m$ is an integer of from 0 through 6; $p$ is an ineger of from 0 through 6; when $n$ is 0, the sum of $m+p$ is an integer of from 3 through 6; when $n$ is 1, the sum of $m+p$ is an integer of from 1 through 4; when $n$ is 2, the sum of $m+p$ is an integer of from 0 through 2; and the sum of $n$ and $p$ is always at least 1, (C) the relative proportions of said amine modified resin and said aromatic polycarboxylic compound being such that said composition is thermoset by heat.

PREFERRED EMBODIMENTS

NOVOLAC BINDERS

The binder resin can be conventional preformed two stage phenolic-formaldehyde novolac resins. Procedures for preparation of such resins are disclosed in the publication, "Polymer Processes" by C. E. Schildknicht, Interscience Publishers Inc., New York, New York (1956), page 315. The methods of making such preformed novolac resins are well known to those skilled in the art and do not constitute a part of the invention. A preferred novolac binder resin has been disclosed in U.S. Pat. No. 3,538,052 by H. P. Higginbottom as a post-alkylated novolac resin wherein the alkylating materials are a mixture of arylalkenes, arylcycloalkenes, dicyclopentadienes and cyclopentadiene/acylic conjugated diene codimers.

In general, these post-alkylated novolacs are made using preformed novolacs as starting materials. Such preformed novolacs are conventionally made, as by first reacting from about 0.4 to 0.95 mol of aldehyde per mol of phenol under acidic catalyzed aqueous phase reaction conditions until a condensation product of aldehyde with phenol having desired characteristics is produced.

The term "phenol" and the term "aldehyde" each have established meanings of scope in the art of phenolic resins and are used throughout this disclosure and claims in accordance with their generic art established meanings. Thus, the term "phenol" refers to an aromatic six-membered moiety which is substituted with a hydroxyl group. This moiety can be further substituted with other radicals including alkyl radicals, aryl radicals, halo radicals, (including fluorine, chlorine, bromine and iodine), hydroxyl groups and the like as those skilled in the art fully appreciate. A preferred phenol is phenol itself. Similarly, the term "aldehyde" has reference to organic compounds containing the characteristic group:

Examples of suitable aldehydes known to the phenol-aldehyde resin art include aliphatic aldehydes, such as propionaldehyde, acetaldehyde and the like; aromatic aldehydes such as benzaldehyde and the like, cyclic aldehydes such as furfural and the like and mixtures of such. A preferred aldehyde is formaldehyde.

A preferred procedure for making a preformed novolac starting resin involves refluxing aldehyde and phenol in the afore-indicated mol ratios under aqueous phase conditions with an acidic catalytic material such as sulphuric acid, phosphoric acid, oxalic acid and the like, for a time of from about 20–140 minutes. Then the mixture is dehydrated under vacuum to about 120–160° C. and cooled to produce a solid product.

It will be appreciated that the aldehyde to phenol ratios herein described have reference to the total amount of phenol present before a reaction, including the phenol which is substituted.

Such a preformed novolac resin starting material can be reacted with a controlled mixture of arylalkenes, arylcycloalkenes, dicyclopentadienes and cyclopentadiene/acylic conjugated diene codimers herein termed the diene codimer mixture which comprises a form substantially free of other materials.

Such a starting material diene codimer compound mixture can be prepared synthetically or derived by suitable preparative procedures from naturally occurring crude petroleum, as those skilled in the art will appreciate. A preferred mixture of such diene codimer compounds for use in this invention is a petroleum derived blend of components having diluents already incorporated thereinto. For example, one suitable such mixture is available commercially under the trade designation "Resin Former P" from the Hess Oil and Chemical Company.

To react a preformed novolac with such an aforedescribed diene codimer compound mixture, it is convenient to use Friedel-Crafts conditions.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent catalyst in the presence of appropriate heat and pressure. Conveniently, the preformed novolac and suitable Friedel-Crafts acid catalyst are mixed, brought to the proper temperature and the diene codimer mixture metered into the acidified (or catalyzed) preformed novolac.

For purposes of this invention, the reaction with preformed novolac is preferably carried out at temperatures in the range of from about 25° to 200° C., although higher and lower temperatures can be used. Also, the reaction is preferably conducted under liquid phase conditions at or below atmosphere pressures although superatmospheric pressures can be used. Inert hydrocarbons, as indicated above, generally facilitate the process. Such inert hydrocarbons can be readily removed, such as by vacuum stripping, at the completion of the reaction is desired. Especially when stripping is contemplated, the most preferred inert hydrocarbons have boiling poiints between about 70° and 140° C. The progress of the reaction can be monitored, if desired, by measuring the quantity remaining of unreacted diene codimer compound using, for example, vapor phase chromoatography.

While anly combination of diene codimer compound starting mixture, preformed novolac and catalyst can be used, it is particularly convenient to react for each 100 parts by weight of starting preformed novolac about5 to 100 by weight parts of such diene codimer compound mixture in the presence of less than about 10 weight percent (based on the preformed novolac) of acid catalyst. Preferably from 0.1 to 1.0 weight percent of acid catalyst is used.

The reaction mass is then heated to a temperature in the range of from about 25° to 200° C. The rate of this reaction is dependent, to some degree, on the temperature employed. In general, the reaction is rapid, and a complete reaction between preformed movolac and diene codimer compound mixture is preferred. For the purpose of insuring complete reaction, generally a heating time of from about 10 minutes to 4 hours is employed.

The properties (e.g., molecular weight distribution, color and the like) of a given so-substituted novolac product are affected by the conditions used to make that product. The resulting reaction product is as those skilled in the art will appreciate, a complex mixture of various different substituted phenols produced from the reaction of novolac under Friedel-Crafts conditions with diene codimer compound starting mixture to produce novolac molecules which are substituted both on phenyl ring carbon atoms and on phenyl hydroxyl oxygen atoms by moieties derived from such diene codimer compound mixture.

The novolac resins of this invention before use are typically formulated with a curing agent in order to produce a thermosettable composition. Although any conventional novolac curing agent can be used, it is preferred to employ those which are substantially nonvolatile at room temperatures and pressures.

The curing agent employed herein can be hexamethylenetetramine; an epoxy compound containing the group:

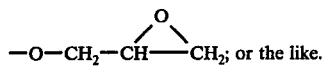

However, in the preferred practice of this invention, hexamethylenetetramine is employed as the curing agent.

Although liquid curing agents can be used in the practice of this invention, particulate solid curing agents are preferred.

Preferably, when the curing agent is such a solid, it has an average (maximum dimension) particle size of less than about 100 microns. Initially, at the time of admixing, it is preferably, though no necessarily, in a finely divided form (i.e., under about 44 microns in maximum average dimension, and more preferably under about 100 microns).

Mixing of curing agent with novolac can be accomplished by any conventional means, such as by physically intermixing a powdered novolac with the curing agent until a uniform composition is obtained.

The thermosetting novolac resin and curing agent compositions comprise from about 3 to 25 parts by weight of curing agent per 100 parts by weight of substituted phenol-aldehyde novolac. Preferably, the amount of curing agent present in these compositions ranges from about 10 to 20 parts by weight per 100 parts by weight of novolac resin.

It may be desirable to also incorporate conventional materials with the powdered, solid phenolaldehyde novolac and the curing agent. This includes, for example, such materials as powdered rubber, linseed oil, magnesium silicate, calcium carbonate, barytes, talc, clay, finely divided asbestos fibers, pigments having tinctorial properties and glass fibers. The amount of these fillers can vary depending upon the desired end application or use of the resin. They may be first added to the novolac during the preparation thereof or they may be added during the preparation of the composition of novolac and curing agent.

This product is useful as an adhesive and binder for particulate materials. In general, the novolac resins in powder form find use in all applications known to the prior art where thermosetting powdered resins are used.

FRICTION PARTICLES

Heretofore, those skilled in the art of phenolic resins have long apreciated that such resins, especially those of the novolac type, have their thermosetting character enhanced or promoted through the use of curing agents, such as hexamethylenetetramine, and the like. The art has long sought to improve the characteristics of cured (crosslinked) thermosettable phenolic resins through varying either or both the chemical compositions and amounts, respectively, of phenolic resin and curing agent employed in any given instance.

One of the characteristics of thermoset phenolic resins which has been particularly difficult to improve has been that of thermal stability, such as the ability of a particular thermoset phenolic resin to withstand, and be stable to, prolonged exposure to elevated temperature. Such thermal stability can be measured by any convenient means, such as by thermal gravimetric analysis, or by strength retension measurements (or weight loss measurements) of standardized laminate constructions (containing a given thermoset phenolic resin to be tested).

Such difficulties in improving thermal stability, recent evaluations have apparently shown, are probably inherently caused by the structural limitations in three-dimensional crosslinked phenolic resins. A cured phenolic resin does not heat soften or change dimensions upon heat exposure but instead tends to degrade and lose structural integrity once an inherent threshold temperature (typically, about 450° F.) has been exceeded for an appreciable period of time.

A new and much improved class of thermoset phenolic resins has now been discovered. This class comprises a thermosettable mixture of amine modified novolac resins and aromatic polycarboxylic compounds. When compared with conventional novolacs conventionally cured (as with hexamethylenetetramine), this new class of phenolic resins has surprising thermal stability when thermoset. This improvement in thermal stability is, it is theorized (and there is no intent to be bound by theory herein), a result of the increased structural strength on a molecular crosslinking basis associated with these new phenolic resins.

The present invention relates to new and useful thermoset phenolic resin compositions of matter, to thermoset compositions produced therefrom, and to articles of manufacture incorporating such compositions. In relation to comparable prior art phenolic resin compositions, these new compositions generally have improved thermostability as thermoset.

The thermoset compositions of this invention comprise at least one amine modified novolac phenolic resin and at least one aromatic polycarboxylic compound. Such an amine modified novolac resin is generally characterized by having:

(1) A number average molecular weight of from about 200 to 1000,
(2) At least two aryl moieties per molecule, the aryl nucleus of each aryl moiety containing from 6 through 10 carbon atoms each,
(3) At least one divalent bridging moiety of the formula:

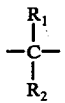

wherein $R_1$ and $R_2$ are each individually selected from the group consisting of hydrogen lower alkyl, lower alkalene, lower haloalkyl, aryl of from 6 through 12 carbon atoms, haloaryl of 6 through 12 carbon atoms, and heterocyclic structures containing rings with 5 or 6 members each, each individual ring containing an oxygen, a sulphur, or a nitrogen atom, each such heterocyclic structure being bonded to the carbon atom of said bridging moiety, said bridging moiety having the unsatisfied valences of its carbon atom each bonded to a different one of said aryl moieties, (4) At last one >NH group per molecule one bond of which is directly attached to one of said aryl nuclei and the other bond of which is attached to another of said aryl nuclei or to a radical $R_1$ as defined above,
(5) At least one OH group per molecule each such group being directly attached to a different one of said two aryl nuclei,
(6) A percent oxygen acetyl of from about 3 to 26, and
(7) A percent nitrogen acetyl of from about 3 to 26.

Similarly, such an aromatic polycarboxylic compound is characterized as being within the given class of compounds having the general formula:

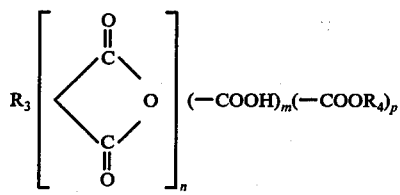

in which $R_3$ is an aromatic radical of three, four, five or six valences and containing from 6 to 24 carbon atoms, $R_4$ is a monovalent hydrocarbon radical containing less than 19 carbon atoms; $n$ is an integer of from 0 through 3; $m$ is an integer of from 0 through 6; $p$ is an integer of from 0 through 6; when $n$ is 0, the sum of $m+p$ is an integer of from 3 through 6, when $n$ is 1, the sum of $m+p$ is an integer of from 1 through 4; when $n$ is 2, the sum of $m+p$ is an integer of from 0 through 2; and the sum of $n$ and $p$ is always at least 1.

Preferably, $R_1$ and $R_2$ are both hydroben, $R_3$ contains a single six membered aromatic ring (i.e., phenyl), and $R_4$ is a lower alkyl radical. The term "lower" as used herein refers to a radical containing less than seven carbon atoms.

In general, in any given composition of this invention, there is present for a given amount of such amine modified novolac resin, at least sufficient amount of such aromatic polycarboxylic compound to make the resulting composition thermosettable by heat alone (especially when such composition is in the form of a uniform mixture of the respective two components); for example, at a temperature of about 150° C.

In general, thermosetting of a thermoset resin composition of this invention results from the reaction of an aromatic polycarboxylic compound with the reactable aromatic amine and the reactable aromatic hydroxyl group in an amine modified novolac starting material. Sometimes as little as about 5 or 10 weight percent (or even less) of the stoichiometric amount (that is, the amount of dicarboxyl compound) needed to completely react on a 1:1 mol basis each reactable aromatic amine group plus each reactable aromatic hydroxyl group with dicarboxyl compound is sufficient to effect thermosetting. On the other hand, sometimes as much as a 100% excess (or even more) of the stoichiometric amount as just described of dicarboxyl compound is desirable in a composition of the invention to produce thermosetting of a composition of this invention. Preferably, from about 80 to 110 weight percent of such stoichiometric amount is employed.

For purposes of this invention, the term "thermoset" in reference to compositions of this invention indicates that a given thermosettable composition, after exposure to elevated temperatures for times sufficient to substantially completely react together substantially all of one of the two components (depending upon which one is present in excess of stoichiometric amount) with the other component comprising a composition of this invention so as to produce a product which is not only substantially insoluble, but also is substantially infusible. For purposes of this invention, the term "substantially insoluble" in relation to "thermoset" has reference to insolubility in common organic solvents, such as methyl ethyl ketone, so that not more than about 10 weight percent of a given so thermoset product dissolves in such a solvent. Similarly, the term "substantially infusible" has reference to the fact that a given or thermoset product does not appreciably melt before decomposing when heating to elevated temperatures.

Because of the tendency for undesirable side reactions to occur and because of the possibility that the thermosettable compositions of this invention will not uniformly crosslink in the presence of appreciable amounts of moisture, the thermosettable compositions of this invention are prepared using amine modified novolacs and aromatic polycarboxylic compoounds, respectively, in substantially anhydrous form. The term "substantially anhydrous" has reference to the fact that a given material contains initially less than about 5 weight percent free water (based on total weight) and preferably less than about 1 weight percent thereof and most preferably less than about one-half weight percent thereof.

THE AMINE MODIFIED NOVOLAC STARTING MATERIAL

In general, any amine modified novolac resin known to the prior art having the above-described characteristics can be used in the compositions of this invention. Because of possible ambiguities in prior art teachings relating to production of amine modified novolacs, a brief discussion of the preparation and properties thereof are now given.

For purposes of this invention, "oxygen acetyl percent " of an amine modified novolac is conveniently determined by the method of Stroh and Liehr, J. Prakt. Chem. 29 (1-2), H. (1965).

Similarly, for purposes of this invention, "total acetyl percent" of an amine modified novolac is conveniently determined by the method of Siggia. Nitrogen acetyl percent is obtained by difference.

Typical beginning materials suitable for use in making amine modified novolac resins are:
- (A) A phenol which has at least one unsubstituted reactive position on the aromatic nucleus,
- (B) An aromatic amine which has at least one primary amine group or at least one secondary amine group substituted on an aromatic nucleus, and
- (C) An aldehyde containing at least one aldehyde group.

The phenols which can be employed in this invention are aromatic alcohols which have at least one hydroxyl group directly attached to the aromatic nucleus and which have at least one unsubstituted reactive position on the aromatic nucleus. It is normally the case that the reactive positions on the aromatic nucleus are those which are ortho and para to the hydroxyl group. Therefore, phenols which have at least one unsubstituted position ortho or para to the hydroxyl group are particularly useful.

Preferred phenols are phenol itself, alkylphenols, and aryl phenols wherein substituents on this phenol benzene ring have a total of from 1 to 8 carbon atoms, and most preferably, from 1 to 6 carbon atoms.

The aromatic starting amines which can be employed can be of many different types. Thus, it can be a class represented by the formula:

ArNH$_2$ wherein Ar is an aryl group which has at least one unsubstituted reactive position on the aromatic nucleus. It can also be a class represented by the formula:

ArNH
|
R$_5$ wherein Ar is as just defined and R$_5$ is an alkyl radical, an aralkyl radical, an alkaryl radical, or the like. Preferably, Ar is a phenyl radical and R$_5$ contains less than 11 carbon atoms.

Ordinarily, the reactive positions are those which are ortho and para to the amino group. Accordingly, aromatic amines which have at least one unsubstituted position ortho or para to the amino group are preferred for use in preparing the condensation products employed in the invention. The presently most preferred aromatic amines are aniline, the alkyl-substituted anilines wherein the alkyl groups thereof have from 1 to 4 carbon atoms, and the alkyl-substituted diaminobenzenes wherein the alkyl groups thereof have from 1 to 4 carbon atoms.

The amines operative in the present invention can be aromatic diamines. Both aromatic primary and secondary diamines are operative in the present invention, but the aromatic primary diamines are preferred over the secondary because the secondary diamines are less desirable as the thermal stability and hydrolytic stability are apparently less than the primary diamines. The diamines are of the general formula:

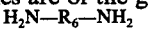
H$_2$N—R$_6$—NH$_2$ wherein R$_6$ is a divalent aromatic radical. Also operative are aromatic diamines having the general formula:

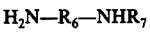
H$_2$N—R$_6$—NHR$_7$ wherein R$_6$ is as above defined and R$_7$ is an alkyl radical, an aryl radical, an aralkyl radical, an alkaryl radical, or the like. Preferably, R$_6$ is a phenyl radical and R$_7$ is a lower alkyl radical.

The aldehydes which can be employed are alkanals such as formaldehyde, acetaldehyde, propionaldehyde and the like, arylals such as benzaldehyde, salicylaldehyde, and the like, haloalkanols, such as chloral, and the like. Formaldehyde is preferred. The formaldehyde can be employed in water solution or dispersion, or in an organic solvent such as methanol. It is preferred to employ the formaldehyde in aqueous solution (such as the 37 weight percent aqueous solution known as formalin). Paraform can also be used.

Sometimes, if desired, the phenol and the aromatic amine can be combined into a single starting compound wherein the same aromatic nucleus has substituted thereon at least one hydroxyl group and at least one primary or secondary amine group. Similarly, if desired, the phenol and the aldehyde can be combined into a single starting compound wherein the same aromatic nucleus has substituted thereon at least one aldehyde group and at least one hydroxyl group. Similarly, if desired, the aromatic amine and the aldehyde can be combined into a single starting compound wherein the same aromatic nucleus has substituted thereon at least one aldehyde group and at least one primary or secondary amine group.

When such a composite polyfunctional starting material is employed, it is preferred to use such in admixture with an aromatic amine, a phenol and an aldehyde. For example, one could employ up to about 50 weight percent of such a polyfunctional material in making an amine modified novolac.

When one makes an amine modified novolac resin using, for example, a phenol, an aromatic amine and an aldehyde, it is convenient and preferred to condense the starting materials under aqueous liquid phase conditions using heat and an acid catalyst. Conventional and preferred acid catalysts are organic carboxylic acids (mono or polybasic) which are relatively strong as respects their disassociation constants. Examples of suitable such acid catalysts include: aliphatic carboxylic acids, such as formic, propionic, oxalic, diglycolic, fumaric, itaconic, lactic, maleic, malonic and the like and aromatic mono and dicarboxylic acids, such as naphthoic, phthalic, salicyclic, and the like.

The amount of acid catalyst employed can vary but in general is sufficient to produce a pH in an aqueous liquid phase medium of from about 1.5 to 6.0 (preferably from about 2.0–4.0) but this is not necessarily a critical factor.

The proportion of reactants employed is likewise not necessarily a critical factor and can be varied over a wide range. For example, the mol ratio of aromatic amine groups to phenolic —OH groups ranges from about 90/1 to 1/90 and the mol ratio of aldehyde to the sum of aromatic amine groups plus phenolic —OH groups ranges from about 0.5 to 0.99. For instance, in a preferred specific embodiment, the charged mol ratio of aniline to phenol can range from about 95:5 to 5:95, though a more preferred range is from about 1:1 to 9:1. Sufficiently, and for example, the charged mol ratio of formaldehyde to the sum total of aniline and phenol is less than about 1:1. In general, the higher the aniline content, the higher the formaldehyde to combined aniline and phenol mol ratio can be without a generally undesirable gelation (because gelation substantially prevents post-working) occurring as a side phenomenon during condensation. To avoid gelation in making such a preferred embodiment, the following relationships can be used as guides:

TABLE I

| At-Aniline/phenol mol ratio | Use-Formaldehyde to aniline plus phenol mol ratio |
|---|---|
| 1:1 | Smaller than 0.70:1. |
| 90:10 | Smaller than 0.95:1. |
| 60:40 | Smaller than 0.75:1. |
| 80:20 | Smaller than 0.80:1. |

For such a condensation, the acid catalyst is preferably formic acid, oxalic acid, or propionic acid in an amount of from about 0.5 to 5 parts catalyst per 100 parts phenol (by weight). The temperature of reactants in such preferred embodiment can vary from about 60° to 100° C. Agitation of reactions during condensation is preferably continuous. It is not necessary for the reactants to be charged together to a reactor thus, formaldehyde can be slowly added to a warmed mixture of aniline, phenol and acid catalyst. The entire condensation may be carried out at reflux temperatures if desired. Since a co-condensation reaction is apparently involved, the reaction mechanism, it is theorized, may involve formation of low molecular weight intermediates which initially form, and then possibly rearrange and combine with one another at a later stage. Typically, condensation reaction conditions are maintained until all aldehyde is consumed.

In general, conventional equipment can be employed for the condensation reaction. For example, a reaction kettle equipped with agitator, means for reflux and distillation, nitrogen inlet means, and conventional heat transfer means is suitable. The material of construction can be steel, stainless steel, glass, Monel, or the like.

In general, a preferred method for carrying out the condensation reaction of the phenol, aldehyde and amine starting materials is to add the aldehyde slowly to an agitated mixture of phenol and aromatic amine containing the acid catalyst. This mixture is maintained at a temperature of from about 50° C. to about 125° C., and preferably from about 70° C. to about 105° C. during the addition. After the addition of aldehyde, which can take from about one hour to about four hours or longer, the condensation reaction is continued for about 30 minutes to about 3 hours at a reaction temperature of from about 50° C. to about 125° C., and preferably, from about 95°C. to about 100° C. At the end of the reaction period, the condensation product can then be recovered by stripping off water and unreacted reagents under reduced pressure at temperatures from about 110° C. to about 200° C. and preferably, from about 140°C. to about 170° C.

Another method for carrying out the condensation reaction is to methylolate a phenol (monomethylolation) by reacting a phenol with an aldehyde under base catalysis at temperatures of from about 50° C. to about 110° C., and preferably from about 60° C. to about 80° C. The reaction mixture is then made (slightly) acidic (if not already so) and the aniline is added and condensed with the foregoing at temperatures of from about 50° C. to about 125° C., and preferably from about 95° C. to about 100° C. At the end of the reaction period, the condensation product can be recovered by stripping off water and unreacted reagents under reduced pressure at temperatures from about 110° C. to about 200° C. and preferably, from about 140° C. to about 170° C. Yet another method for carrying out the condensation reaction is to make a phenolic novolac resin using the well known acid catalyzed reaction of phenol and aldehyde. The unrecovered phenolic resin (containing water and unreacted phenol) is then made mildly acidic (if not already so) and the aromatic amine added. The final condensation is then carried out by adding further aldehyde to the foregoing mixture while being maintained at a temperature of from about 50° C. to about 125° C., preferably, from about 95° to about 100° C. At the end of the reaction period, the condensation product can be recovered by stripping off water and unreacted reagents under reduced pressure at temperatures from about 110° C. to about 220° C. and preferably, from about 140°C. to about 170° C.

In general, as first prepared, the amine modified novolac is typically an aqueous solution or dispersion, the exact conditions and respective quantities and types of reactions in any given instance being determinative of the character of the product (including degree of advancement, color, etc.). The amine modified phenolic resin can be concentrated (and even prepared as a solid resin) and impurities such as unreacted reactants largely removed by means of dehydration under vacuum. As those skilled in the art appreciate, typical dehydration conditions are distillation under about 28 inches mercury vacuum until batch temperature reaches about 160° C. though any convenient conditions can be employed.

Yields of amine modified novolac resin typically vary from about 85 to 110% (based on combined starting (charged) weights of aromatic amine and phenol). In general, higher aromatic amine mol ratios, as well as higher aldehyde to phenol plus aromatic amine ratios give higher yields. Aniline-phenol-formaldehyde resins prepared as just described generally have the above-described characteristics and constitute a preferred class of amine modified phenolic resins suitable for use in the present invention.

In general, for use in the present invention, amine modified novolac resins are prepared in the form of substantially anhydrous starting materials, as explained above.

An advantage in dehydrating a starting amine modified novolac is that the dehydration procedure (using heat and reduced pressure as described above) typically also tends to remove impurities from a starting resin, such as unreacted started materials, catalysts, etc.

The aromatic carbonyl-containing compound must contain at least two carbonyl-containing groups in the ortho position. The anhydride groups, each with a valence of two, and each containing two carbonyl-containing groups, are always attached to adjacent carbon atoms on an aromatic ring. The compounds can contain any combination of anhydride, acid, or ester groups. A preferred number of carbonyl-containing groups per molecule is four, such as two anhydride groups, four ester groups, or combination of any four of these carbonyl-containing groups. A particularly preferred aromatic carbonyl containing compound is trimellitic acid anhydride. The aromatic radicals must each contain at least two carbonyl-containing groups attached to adjacent carbon atoms whereas the other carbonyl-containing groups can be on any other ring position.

In general, for use in the present invention, aromatic polycarboxylic compounds are prepared in the form of substantially anhydrous starting materials.

PREPARATION OF COMPOSITIONS

To make a thermostat resinous composition of this invention, one takes an amine modified novolac resin as described above and an aromatic polycarboxylic compound as described above and simply mixes the two components together until a substantially uniform product mixture is obtained. The relative proportions of each are as described above.

In general, the proportion of aromatic polycarboxylic compound to amine modified novolac resin in any given thermosettable composition is such that the composition will thermoset when exposed to an elevated temperature, e.g., a temperature of 150° C. or higher. Preferably, the proportion of aromatic polycarboxylic compound to amine modified novolac resin is such that amide, imide, and/or ester linkages can be formed at each amine hydrogen and each phenolic hydroxyl site within each amine modified novolac resin molecule. However, thermosettability is frequently achievable by using less than all such amine hydrogen and phenolic hydroxyl sites when crosslinking with an aromatic polycarboxylic compound such as taught in this invention. Also, thermosettability is not appreciably affected, within wide limits, by using excesses of stoichiometric amounts of aromatic polycarboxylic compounds in relation to a given quantity of another modified novolac resin. During thermosetting, it should be noted that at higher temperatures, e.g., temperatures say about 200° C. or more, typically, though not necessarily, rearrangements can occur in the thermoset material which result in a higher concentration of one form of linkage as opposed to another. For example, it is tentatively theorized (and there is no intent to be bound by theory herein) that at higher temperatures, rearrangement to form imide linkages is common in a given thermoset product of this invention.

In general, the thermoset resinous compositions of this invention, owing to the initial substantially dehydrated character of each of the amine modified novolac resin and of the aromatic polycarboxylic compounds, respectively, employed in these compositions, are in the form of powders which are characteristically free flowing.

When making a solid, thermoset composition of this invention, it is preferred to use an amine modified novolac resin and an aromatic polycarboxylic compound (as described above, respectively) in the form of solids which have particle sizes generally under about 100 mesh (U.S. Standard sieves). Preferably, particle sizes under about 50 mesh are used. The admixing of one component with the other can be made in a blender, such as a so-called Waring Blender, a ball mill, or the like, although any convenient mechanical mixing means may be employed.

In the solid compositions of this invention, it will be appreciated that the ratio of amine modified novolac resin to aromatic polycarboxylic compounds is as indicated above. However, ever, mixtures of different amine modified novolac resins and of different aromatic polycarboxylic compounds can be employed in any given composition to enhance characteristics desired for a particular end use application as those skilled in the art will readily appreciate.

Thermosettable aromatic amine modified novolac resins in combination with aromatic polycarboxylic compounds as contrasted to the thermoset resins of the present invention, have been disclosed in U.S. Pat. No. 3,558,559 by John R. LeBlanc. The various phenols, aromatic amines and aromatic carboxylic compounds that can be used in the preparation of the thermoset friction particles of the present invention are detailed comprehensively in U.S. Pat. No. 3,558,559 and are incorporated by reference.

The friction particle of this invention may be used alone or with other friction materials known in the art. A typical friction element contains about 30 to 60 weight percent asbestos fiber, up to 40 weight percent other inorganic filler and abrasives, about 5 to 15 weight percent organic filler, including the particle of this invention, and about 15 to 30 weight percent binder; all percents are by weight of total composition. Asbestos fiber, other abrasive materials and filler materials are charged into a mixer followed by the addition of a binder, such as a novolac material. The materials are kneaded until the fiber, abrasives and any fillers are thoroughly mixed and a uniform mass is obtained. The mass is discharged from the mixer, rolled out into sheets or extruded or pressure molded and dried, after which it is ready for further processing into friction elements.

The abrasives, that is, the friction imparting agents and fillers, which may be used in addition to the abrasive material disclosed and claimed herein, within the scope of this invention include, but are not limited to brass chips, metal shavings and filings, silica, talc, wood flour, chalk, clay, mica, fiber glass, felt, carbon black, graphite, metal nitrides and oxides, and ground cashew nut shell oil polymerizate. These abrasives and fillers may be used in addition to the friction particle of this invention to achieve the particular amount of bulk and coefficient of friction desired. Some consumer specifications specify that the friction particle should be 90% finer than 20 mesh and coarser than 100 mesh. Other consumer specifications call for coarser or finer friction particles.

The following examples are set forth to illustrate the practices of this invention to one skilled in the art and are not intended to be restrictive or limit the scope of the invention.

EXAMPLE A-1

Preparation of Amine Modified Phenolic Novolac Resin

A mixture of 1005 grams (10.7 mols) of phenol and 995 grams (10.7 mols) of aniline is heated to 70° C. in a 5-liter, 3-neck Pyrex reaction flash that is equipped with stirrer, thermometer, reflux condenser and dropping funnel. At 70° C., 26.6 grams (0.52 mols) of 90% strength formic acid is added and allowed to mix. Next, over about a 2-½ hour period, 915 grams (15.25 mols) of 50 weight percent aqueous formaldehyde solution is added to the reaction mixture while stirring vigorously. The reaction mixture is refluxed for 45 minutes at about 100° C. The reaction flask is then changed over to vacuum distillation conditions and vacuum slowly applied up to about 7 inches Hg (temperature stabilized at about 90° C.). As the temperature reached about 95° C. (with about 7 inches Hg vacuum), the vacuum is increased slowly to about 10 inches Hg. As the temperature reached about 100° C., the vacuum is increased slowly to about 20 inches Hg. When the temperature reached about 110° C., the vacuum is increased slowly to 28 inches Hg. The temperature is then allowed to rise to 160° C. with 28 inches Hg of vacuum while continuing to distill. At 160° C., the distillation is stopped and the product poured into a pan to cool. The resulting amine modified phenolic resin is a clear, brittle, glasslike solid at room temperature. The distillate has two phases; the lower layer being mostly phenol and aniline and the upper layer being mostly water. The yield of solid resin is about 88% based on the sum of the phenol and aniline charge.

EXAMPLES A-2 THROUGH A-11

Following the same general procedure described in Example A-1, a series of amine modified phenolic resins are prepared from phenol, aniline and formaldehyde. Table 1 below describes each resin.

EXAMPLES A-12 THROUGH A-12

Following the same general procedure described in Example A-1, a series of amine modified phenolic resins are prepared using various substituted phenols and aromatic amines. Table II below describes such resin.

TABLE I

|  | A-2 | A-3 | A-4 | A-5 | A-6 | A-7 |
|---|---|---|---|---|---|---|
| Molar ratio of aniline to phenol | 1/3 | 1/1 | 3/2 | 3/2 | 2/1 | 3/1 |
| Molar ratio of formaldehyde to ailine plus phenol | 0.60/1 | 0.71/1 | 0.725/1 | 0.752/1 | 0.71/1 | 0.71/1 |
| Catalyst | 1 | 2 | 1 | 3 | 2 | 1 |
| Percent yield (based on ailine plus phenol charged) | 82 | 88 | 94 | 88 | 96 | 98 |
|  | A-8 | A-9 | A-10 | A-11 |  |  |
| Molar ratio of aniline to phenol | 4/1 | 9/1 | 9/1 | 10/1 |  |  |
| Molar ratio of formaldehyde to aniline plus phenol | 0.75/1 | 0.93/1 | 0.99/1 | 0.99/1 |  |  |
| Catalyst | 1 | 3 | 1 | 1 |  |  |
| Percent yield (based on aniline plus phenol charged) | 96 | 106 | 110 | 111 |  |  |

1 Formic acid.
2 Propionic acid.
3 Oxalic acid.

TABLE II

|  | A-12 | A-13 | A-14 | A-15 | A-16 |
|---|---|---|---|---|---|
| Molar ratio of phenol | 3.39/1 | 2.74/1 | 2.42/1 | 1.11/1 | 2.06/1 |
| Identification of phenol | 1 | 2 | 3 | 4 | 5 |
| Identification of aromatic amine | 9 | 9 | 9 | 10 | 9 |
| Molar ratio of formaldehyde to aromatic amino plus phenol | 0.725/1 | 0.725/1 | 0.725/1 | 0.725/1 | 0.725/1 |
| Catalyst | 12 | 12 | 12 | 12 | 12 |
|  | A-17 | A-18 | A-19 | A-20 | A-21 |
| Molar ratio of phenol | 1.52/1 | 2.32/1 | 1.96/1 | 1.32/1 | 3.68/1 |
| Identification of phenol | 5 | 6 | 7 | 4 | 8 |
| Identification of aromatic amine | 10 | 9 | 9 | 11 | 9 |
| Molar ratio of formaldehyde to aromatic amine plus phenol | 0.725/1 | 0.725/1 | 0.725/1 | 0.725/1 | 0.725/1 |

TABLE II-continued

|         | A-12 | A-13 | A-14 | A-15 | A-16 |
|---------|------|------|------|------|------|
| Catalyst| 12   | 12   | 12   | 12   | 12   |

1 p-Nonyl phenol.
2 p-Phenyl phenol.
3 t-Butyl phenol.
4 Phenol.
5 p-Chloro phenol.
6 α-Naphthol.
7 3,5-xylenol.
8 Bisphenol A.
9 Aniline.
10 o-Chloroaniline.
11 O-toluidine.
12 Formic acid.

EXAMPLES B (1–9)

100 parts of phenol and 0.5 part concentrated sulfuric acid are charged to a suitable reaction vessel and heated to 95° C. Dropwise, there is added 48 parts 50% formalin at such a rate so that the reaction exotherm is controlled and a uniform atmospheric boil is initiated. After addition of formalin is complete, the reaction mixture is heated at atmospheric reflux (100° C.) for 1 hour. Then this intermediate mixture is dehydrated under vacuum to an end point of about 115° C. at 10 inches Hg vacuum. To this intermediate resin is added 30 parts of diene codimer compound mixture available commerically as "Resin Former P" from the Hess Oil and Chemical Company (described above) over a period of 30 minutes while keeping the temperature at 115°–125° C. The temperature of the mixture is held between 115° and 125° C. after addition of diene codimer compound for 30 minutes. This product mixture is desolvated under vacuum to an end point of about 130° C. at 28 inches Hg vacuum. The product is drained from the reaction vessel while hot and fluid and then allowed to solidify.

The foregoing procedure is repeated using different amounts of either the diene codimer compound mixture or the formaldehyde. The results for all examples are summarized in Table II below.

TABLE III

| Example | Reactants (parts) Phenol | 50% Formaldehyde | Diene Codimer Compound Mixture | Condensation Catalyst (parts) | Alkylation Catalyst (parts) |
|---------|--------|-----|-----|-------------------|----------------------|
| 1 | 100 | 48 | 30 | $H_2SO_4$ (0.5) | (1) |
| 2 | 100 | 51 | 30 | $H_2SO_4$ (0.5) | (1) |
| 3 | 100 | 38 | 30 | $H_2SO_4$ (0.5) | (1) |
| 4 | 100 | 48 | 50 | $H_2SO_4$ (0.5) | (1) |
| 5 | 100 | 48 | 70 | $H_2SO_4$ (0.5) | (1) |
| 6 | 100 | 51 | 30 | Oxalic acid $H_2O$ (0.8) | $H_2SO_4$ (0.3) |
| 7 | 100 | 51 | 30 | " | Toluene sulfonic acid (0.5) |
| 8 | 100 | 48 | 50 | " | $BF_3$ etherate (0.5) |
| 9 | 100 | 48 | 30 | Toluene sulfonic acid (0.5) | (1) |

(1) The catalyst used for the condensation of phenol and formaldehyde also functions as the alkylation catalyst.

TEST PROCEDURES

Friction particles were evaluated in friction element formulations with a Grano Friction Element Tester (GFET). The G.F.E.T. is a friction element test machine which has both the constant input force capabilities of the General Motors Friction Materials Test Machine described in SAE Publication 670510 and the constant output torque capabilities fo the F.A.S.T. machine described in SAE Publication 670079. Basically, the G.F.E.T. is a disc pad tester in which two small friction elements mounted on a rotating support are pressed against a restrained friction plate. The torque generated on the friction plate, as the friction elements move, is recorded and correlated with the normal force applied to the elements. The coefficient of friction is the ratio of the generated tangential force to the normal applied force.

The G.F.E.T. can be operated in either a constant imput (constant normal force) mode or a constant output (constant generated tangential force or torque) mode. The constant input mode is analogous to constant pedal pressure in an automotive brake, while constant output simulates constant deceleration rate. In an ideal brake system, constant input should result in constant output (and vice versa); but in real systems, fade frequently occurs and the coefficient of friction often changes as the brake temperature and history changes.

The G.F.E.T. can also be used to measure wear. By measuring specimen thickness before and after a test, wear can be measured as a function of temperature, generated torque, etc. for a given test duration. In addition, the G.F.E.T. can be used to get a rough idea of noise which may be generated when brakes are applied.

A. Specimen Preparation

Two basic procedures are utilized in preparing specimens for testing in the G.F.E.T. These are the cold press process and the hot press process. In general, the cold press process is used with liquid resin systems in which the cold pressed preform has enough coherence to "stick" together during further handling. The hot press process is generally used with dry resins. In both cases, the molded specimens are post-baked to develop full strength and other properties. Typical procedures for mixing, molding and post-baking speciments are presented below. Specific experiments, of course, may utilize different conditions or procedures.
1. Mixing Procedure
   a. Beat asbestos fibers for 1 hour in Patterson-Kelly Blender with intensifier bar.
   b. Weigh out proper amount of asbestos and add to Hobart mixer.
   c. Add resin to asbestos and mix 10 minutes.
   d. Add friction particles and barytes and mix an additional 20 minutes.
2. Cold Press Conditions
   a. Charge enough material to mold to obtain required density in ⅜ inch thick specimen.
   b. Close press to ⅜ inch stops and hold several minutes.
   c. Open press and remove preformed specimens.
3. Hot Press Conditions
   a. Preheat mold to 330°–340° F. (or other desired temperature).
   b. Charge enough material to mold to obtain required density in ⅜ inch thick specimen.
   c. Mold to ⅜ inch stops and breathe mold about 5 times (or as necessary) in first two minutes of molding.
   d. Cure 4 inches dia. disc mold 10 minutes.
   e. Remove specimens from hot mold.
4. Post-Bake Conditions
   a. Cure cold press preforms under slight holding pressure (several psi) in oven at desired temperature. Post-bake cycle depends on resin type but generally reaches 160°–220° C. in about 12 hours.
   b. Cure hot press discs at atm. pressure in air circulating oven. Post-bake cycles vary, but most common run to date is 12 hour cycle with linear temperature increase from 80° C. to 220° C.
5. Specimen Preparation
   a. Cut post-bake discs into ¾ × ¾ inch specimens.
   b. Sand faces parallel before testing.

B. Tests

The primary tests used to evaluate the high temperature performance of the friction particles described were a constant input, continuous drag test similar to the General Motors C-1 Test (described in the C-1 test Procedure of the General Motors Technical Center, Warren, Mich.) and a continuous drag wear test. The tests are summarized as follows:

1. C-1 Test

This test is similar to the SAE J661a fade test except it is not limited to normal forces of 150 psi or specimen temperatures of 650° F. In the C-1 test, normal forces ranging from 50 psi to 200 psi are applied during a 15 minute constant input, continuous drag test. As used with the G.F.E.T., the C-1 test utilizes five consecutive 15 minute drag tests with successive normal pressures of 50, 100, 150, 200 and 50 psi. The coefficient of friction is plotted as a function of temperature at each 1 minute interval and wear is measured after each test. As with the J661a wear test, the C-1 wear measurements are of little value since they do not hold output work (torque) constant. The C-1 fade measurements, however, are very helpful in development work since they show exactly when various formulations begin to fade. Many systems do not fade until 700°–800° F. and would not be described fully in the 650° F. max. J661a test. The C-1 test frequently reaches temperatures above 800° F. and tests have been run above 1,000° F.

2. Wear Test

This test provides a constant output torque measure of wear. In the G.F.E.T. wear test, the specimen temperature is held constant (generally at 650° F.) and the specimens are subjected to 200 in.-lbs. of torque while moving at 20 ft./sec. for 20 minutes.

The following examples illustrate practice of the present invention.

EXAMPLE 1

330 grams of resin from Example A-4, 670 grams of resin from Example A-9 and 600 grams of trimellitic anhydride (TMA) are ground together through a laboratory Raymond mill (hammer mill) until essentially all of the material passes U.S. Sieve No. 140. The product is placed in an aluminum tray and heated for 1 hour in a 500° F. air-circulating oven. At the end of this period the material has foamed up and has the shape of a bread loaf. The cooled brittle loaf is broken up and ground to 60 mesh and again placed in the aluminum tray and reheated for 1 hour at 500° F. The dark final product is ground and sieved to 60–140 mesh and made up into a disc brake pad by blending 10 parts by weight of the friction particle product with 10 parts barytes, 60 parts asbestos and 20 parts Resinox RI-4052 (an alkylated phenolic novolac resin compound available from the Monsanto Company). The disc pad formulation is molded at 335° F., 200 psi for 11 minutes and then cut into test specimens. The test specimens are post baked for 12 hours in an oven programmed from 50° C. to 220° C. The specimens are then cooled, machined to required width and tested in a Grano Friction Element Tester (G.F.E.T.). A control was prepared in the same manner using Cardolite N-104-40 (3 M Company) as the friction particle.

The following results were obtained in a C-1 test at 200 psi constant input load.

| Time of Test (Min.) | Coefficient of Friction | | Disc Temperature ° F. | |
|---|---|---|---|---|
| | Cardolite | Ex. 1 | Cardolite | Ex. 1 |
| 0 | 0.33 | 0.30 | 100 | 100 |
| 10 | 0.28 | 0.41 | 715 | 675 |
| 15 | 0.09 | 0.53 | 785 | 970 |

The following wear data were obtained in a G.F.E.T. wear test run at 200 in.-lbs. output torque, 650° F., 20 ft./sec., 20 minutes continuous drag:

| Friction Particle | Specimen Weight Loss | | Specimen Thickness Loss | |
|---|---|---|---|---|
| | (gms) | (%) | (ins) | (%) |
| Cardolite | 0.3640 | 6.4 | 0.195 | 5.4 |
| Example 1 | 0.4527 | 7.2 | 0.235 | 6.5 |

EXAMPLE 2

330 grams of resin from Example A-4, 670 grams of resin from Example A-9 and 300 grams of TMA are formulated and processed into a friction particle as described in Example 1. It is then formulated and made into a friction element by blending as described in Example 1 except 20 parts of Resinox 753 is used as the binder instead of Resinox RI-4052. Resinox 753 is a phenol/formaldehyde novolac resin made by Monsanto Company. Testing in the C-1 and wear test as described in Example 1 gives the following results:

| C-1 Test | | | | |
|---|---|---|---|---|
| Time of Test (Min.) | Coefficient of Friction | | Disc Temperature °F. | |
| | Cardolite | Ex. 2 | Cardolite | Ex. 2 |
| 0 | 0.26 | 0.28 | 100 | 100 |
| 10 | 0.29 | 0.28 | 595 | 560 |
| 15 | 0.27 | 0.47 | 810 | 835 |

| Wear Test | | | | |
|---|---|---|---|---|
| Friction Particle | Specimen Weight Loss | | Specimen Thickness Loss | |
| | (gms) | (%) | (ins) | (%) |
| Cardolite | 0.4674 | 7.7 | 0.023 | 6.4 |
| Example 2 | 0.3971 | 6.7 | 0.0185 | 5.1 |

EXAMPLE 3

A friction particle similar to that of Example 1 is prepared except that benzophenone tetracarboxylic acid dianhydride (BTDA) is used instead of TMA. The friction particles are formulated and made into a friction element as in Example 2 and a C-1 test and wear test are run with the following results:

| Time of Test (Min.) | Coefficient of Friction | Disc Temperature (° F.) |
|---|---|---|
| 0 | 0.27 | 100 |
| 10 | 0.25 | 700 |
| 15 | 0.46 | 945 |

| Wear Test | | | |
|---|---|---|---|
| Specimen Weight Loss | | Specimen Thickness Loss | |
| (gms) | (%) | (ins) | (%) |
| 0.9571 | 1.5 | 0.053 | 15.0 |

EXAMPLE 4

A friction particle identical to Example 1 is prepared with 450 gms of TMA instead of 600 gms. The friction particles are formulated and made into friction elements as described in Example 1 and a C-1 and wear test is run with the following results:

| C-1 Test | | |
|---|---|---|
| Time of Test (Min.) | Coefficient of Friction | Disc Temperature (° F.) |
| 0 | 0.29 | 100 |
| 10 | 0.44 | 745 |
| 15 | 0.48 | 1040 |

| Wear Test | | | |
|---|---|---|---|
| Specimen Weight Loss | | Specimen Thickness Loss | |
| (gms) | (%) | (ins) | (%) |
| 1.6099 | 30.2 | 0.105 | 29.0 |

Other Binder Resins

Novolac resins are the preferred binder resins for the brake lining composition as described. However, the invention is not limited to such binder resins. Other resin binder materials for brake lining compositions are known to those skilled in the art, e.g. vulcanized rubbers, crosslinked drying oils and in particular thermosettable phenolic resole resins.

Preparation of a Phenolic Resole Resin

EXAMPLE 5

About 2800 grams (26.7 mols) of phenol and 2860 grams (35.2 mols) of 37 weight percent formalin are charged to a 3 gallon stainless steel reaction kettle equipped with a horseshoe agitator, thermometer, reflux condenser and necessary piping. The temperature is adjusted to about 35° C. 25 grams (0.08 mols) of barium hydroxide octohydrate dissolved in 50 grams of hot water are added, together with 100 grams (0.69 mols) of hexamethylenetetramine. The batch is heated to a 65° C. vacuum reflux (about 3.0 p.s.i.a.). It is maintained at 65° C. for about 2-½ hours. At the end of the reflux time, the kettle is changed over to vacuum dehydration with the vacuum being increased slowly to about 1.5 p.s.i.a. The batch is dehydrated with the vacuum being increased to about 1.0 p.s.i.a. as the temperature rises to about 50° C. Dehydration is continued until the resin is grindable by test (usually at about 85°–90° C. with 1.0 p.s.i.a. vacuum). When a sample of the resin is grindable (completely brittle at room temperature), the batch is poured into a pan to cool. A fan is used to cool the resin rapidly to room temperature. The resulting phenolic resole lump resin is an essentially clear, low melting solid at room temperature. The yield of solid resin is about 126% on the phenol charge.

EXAMPLE 6

About 20 parts of the resole resin of Example 5 was blended with 10 parts of the friction particles of Example 1, 10 parts of barytes and 60 parts of asbestos to form a disc pad formulation. The formulation was molded into a disc pad and tested as in Example 1. The tests showed that the pad had properties comparable to disc pads formulated with novolac binders.

What is claimed is:

1. In a brake lining composition comprising friction particles and a resin binder therefor, wherein said improvement comprises, said friction particles comprising a thermoset reaction product of
    (A) an aromatic amine modified novolac resin characterized by having:
        (1) a number average molecular weight of from about 200 to 1000,
        (2) at least two aryl moieties per molecule, the aryl nucleus of each aryl moiety containing from 6 through 10 carbon atoms each,
        (3) at least one divalent bridging moiety of the formula:

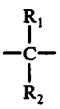

wherein $R_1$ and $R_2$ are each individually selected from the group consisting of hydrogen, lower alkyl, lower alkalene, lower haloalkyl aryl of from 6 through 12 carbon atoms and haloaryl of 6 through 12 carbon atoms, said bridging moiety having the unsatisfied valences of its carbon atom each bonded to a different one of said aryl moieties,
        (4) at least one >NH group per molecule, one bond of which is directly attached to one of said aryl nuclei and the other bond of which is attached to another of said aryl nuclei or to a radical $R_1$ as defined above,
        (5) at least one OH group per molecule each such group being directly attached to a different one of said two aryl nuclei, (6) a percent oxygen acetyl of from about 3 to 26, and (7) a percent nitrogen acetyl of from about 3 to 26, and (B) an aromatic polycarboxylic compound of the formula:

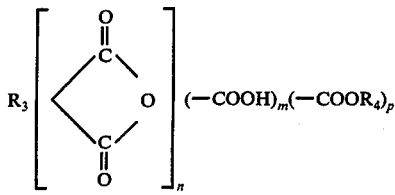

in which $R_3$ is an aromatic radical of three, four, five or six valences and containing from 6 to 24 carbon atoms, $R_4$ is a monovalent hydrocarbon radical containing less than 19 carbon atoms; $n$ is an integer of from 0 through 3; $m$ is an integer of from 0 through 6; $p$ is an integer of from 0 through 6; when $n$ is 0, the sum of $m+p$ is an integer of from 3 through 6; when $n$ is 1, the sum of $m+p$ is an integer of from 1 through 4; when $n$ is 2, the sum of $m+p$ is an integer of from 0 through 2; and the sum of $n$ and $p$ is always at least 1, (C) the relative proportions of said amine modified resin and said aromatic polycarboxylic compound being such that said composition is thermoset by heat said thermoset friction particles being infusible at temperatures above 700° F., being dispersed in and held in place by said binder resin.

2. A composition of claim 1 wherein said aromatic polycarboxylic compound is an ester of trimellitic anhydride.

3. A composition of claim 1 wherein said aromatic polycarboxylic compound is an ester of benzophenone tetracarboxylic anhydride.

4. A composition of claim 1 wherein said aromatic polycarboxylic compound is an ester of pyromellitic anhydride.

5. A composition of claim 1 wherein said resin binder comprises a thermosettable phenol-formaldehyde novolac resin.

6. A composition of claim 1 wherein said composition contains additives, selected from the group consisting of asbestos, fillers and abrasives or mixtures thereof.

7. In a method of forming a brake lining composition comprising the blending of a resin binder, friction particles and additives wherein the improvement comprises, the blending of friction particles comprising a thermoset reaction product of:

(A) an aromatic amine modified novolac resin characterized by having:
  (1) a number average molecular weight of from about 200 to 1000,
  (2) at least two aryl moieties per molecule, the aryl nucleus of each aryl moiety containing from 6 through 10 carbon atoms each,
  (3) at least one divalent bridging moiety of the formula:

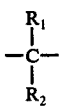

wherein $R_1$ and $R_2$ are each individually selected from the group consisting of hydrogen, lower alkyl, lower alkalene, lower haloalkyl aryl of from 6 through 12 carbon atoms and haloaryl of 6 through 12 carbon atoms, said bridging moiety having the unsatisifed valences of its carbon atom each bonded to a different one of said aryl moieties, (4) at least one >NH group per molecule, one bond of which is directly attached to one of said aryl nuclei and the other bond of which is attached to another of said aryl nuclei or to a radical $R_1$ as defined above,
  (5) at least one OH group per molecule each such group being directly attached to a different one of said two aryl nuclei,
  (6) a percent oxygen acetyl of from about 3 to 26, and
  (7) a percent nitrogen acetyl of from about 3 to 26, and (B) an aromatic polycarboxylic compound of the formula:

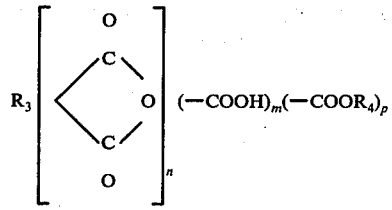

in which $R_3$ is an aromatic radical of three, four, five or six valences and containing from 6 to 24 carbon atoms, $R_4$ is a monovalent hydrocarbon radical containing less than 19 carbon atoms; $n$ is an integer of from 0 through 3; $m$ is an integer of from 0 through 6; $p$ is an integer of from 0 through 6; when $n$ is 0, the sum of $m+p$ is an integer of from 3 through 6; when $n$ is 1, the sum of $m+p$ is an integer of from 1 through 4; when $n$ is 2, the sum of $m+p$ is an integer of from 0 through 2; and the sum of $n$ and $p$ is always at least 1, (C) the relative proportions of said amine modified resin and said aromatic polycarboxylic compound being such that said composition is thermoset by heat said thermoset friction particles being infusible at temperatures above 700° F., being dispersed in and held in place by said binder resin.

8. A method of claim 7 wherein said aromatic polycarboxylic compound is an ester of trimellitic anhydride.

9. A method of claim 7 wherein said aromatic polycarboxylic compound is an ester of benzophenone tetracarboxylic anhydride.

10. A method of claim 7 wherein said aromatic polycarboxylic compound is an ester of pyromellitic anhydride.

11. A method of claim 7 wherein said resin binder comprises a thermosettable phenol-formaldehyde novolac resin.

12. A method of claim 7 wherein said resin binder comprises a thermosettable phenol-formaldehyde resole resin.

13. A composition of claim 1 wherein said resin binder comprises a thermosettable phenol-formaldehyde resole resin.

14. A composition of claim 1 wherein said composition comprises about 15 to 30% by weight of said resin binder, about 30 to 60% of asbestos, up to about 40% of fillers and abrasives and about 5 to 15% by weight of said friction particles.

* * * * *